(12) United States Patent
Tsuchikawa (10) Patent No.: US 12,218,342 B2
(45) Date of Patent: Feb. 4, 2025

(54) ENERGY STORAGE DEVICE

(71) Applicant: GS Yuasa International Ltd., Kyoto (JP)

(72) Inventor: Tomoya Tsuchikawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 610 days.

(21) Appl. No.: 17/598,506

(22) PCT Filed: Mar. 23, 2020

(86) PCT No.: PCT/JP2020/012642
§ 371 (c)(1),
(2) Date: Sep. 27, 2021

(87) PCT Pub. No.: WO2020/203400
PCT Pub. Date: Oct. 8, 2020

(65) Prior Publication Data
US 2022/0190321 A1    Jun. 16, 2022

(30) Foreign Application Priority Data
Mar. 29, 2019 (JP) .................. 2019-068528

(51) Int. Cl.
*H01M 4/36* (2006.01)
*H01G 11/24* (2013.01)
(Continued)

(52) U.S. Cl.
CPC ............ *H01M 4/364* (2013.01); *H01G 11/24* (2013.01); *H01G 11/52* (2013.01);
(Continued)

(58) Field of Classification Search
CPC .. H01M 4/364; H01M 50/431; H01M 50/443; H01M 50/489; H01M 2004/021; H01G 11/24; H01G 11/52
(Continued)

(56) References Cited

U.S. PATENT DOCUMENTS

2010/0221965 A1    9/2010    Katayama et al.
2012/0189897 A1    7/2012    Wakizaka et al.
(Continued)

FOREIGN PATENT DOCUMENTS

| JP | 2009-4386 A | 1/2009 |
|---|---|---|
| JP | 2009-238587 A | 10/2009 |

(Continued)

OTHER PUBLICATIONS

International Search Report (ISR) dated Jun. 9, 2020 filed in PCT/JP2020/012642.

*Primary Examiner* — James M Erwin
*Assistant Examiner* — Kevin Nguyen
(74) *Attorney, Agent, or Firm* — RANKIN, HILL & CLARK LLP (57) ABSTRACT

One aspect of the present invention is an energy storage device including: an electrode having a mixture layer containing active material particles; and a separator having an inorganic layer facing the mixture layer, the inorganic layer containing inorganic particles, in which the active material particles have two or more peaks in volume-based particle size distribution, and an average particle diameter of the inorganic particles is 1.2 μm or less.

12 Claims, 3 Drawing Sheets

(51) Int. Cl.
*H01G 11/52* (2013.01)
*H01M 50/431* (2021.01)
*H01M 50/443* (2021.01)
*H01M 50/489* (2021.01)
*H01M 4/02* (2006.01)

(52) U.S. Cl.
CPC ....... *H01M 50/431* (2021.01); *H01M 50/443* (2021.01); *H01M 50/489* (2021.01); *H01M 2004/021* (2013.01)

(58) Field of Classification Search
USPC .......................................................... 429/142
See application file for complete search history.

(56) References Cited

U.S. PATENT DOCUMENTS

| | | | |
|---|---|---|---|
| 2012/0270090 A1* | 10/2012 | Shinohara | H01M 50/446 428/220 |
| 2014/0004400 A1 | 1/2014 | Ueki et al. | |
| 2014/0272534 A1 | 9/2014 | Ueki et al. | |
| 2014/0322586 A1 | 10/2014 | Lee et al. | |
| 2015/0104704 A1 | 4/2015 | Kim et al. | |
| 2015/0140389 A1 | 5/2015 | Nagai et al. | |
| 2015/0221944 A1 | 8/2015 | Uebo et al. | |
| 2016/0293922 A1 | 10/2016 | Umeyama et al. | |
| 2017/0117546 A1* | 4/2017 | Ko | C01B 32/20 |
| 2018/0233726 A1 | 8/2018 | Nagao | |
| 2019/0245199 A1* | 8/2019 | Zeng | H01M 4/505 |

FOREIGN PATENT DOCUMENTS

| | | | |
|---|---|---|---|
| JP | 2012-22888 A | | 2/2012 |
| JP | 2013030694 A | * | 2/2013 |
| JP | 2013-84525 A | | 5/2013 |
| JP | 2013-114848 A | | 6/2013 |
| JP | 2013-222612 A | | 10/2013 |
| JP | 2013-254639 A | | 12/2013 |
| JP | 2014-11067 A | | 1/2014 |
| JP | 2015-153638 A | | 8/2015 |
| JP | 2015-525950 A | | 9/2015 |
| JP | 2016-48668 A | | 4/2016 |
| JP | 2016-72150 A | | 5/2016 |
| JP | 2016-72154 A | | 5/2016 |
| JP | 2016-189261 A | | 11/2016 |
| JP | 2017-123269 A | | 7/2017 |
| JP | 2017-134997 A | | 8/2017 |
| JP | 2018-6284 A | | 1/2018 |
| JP | 2018055801 A | | 4/2018 |
| JP | 2019-29205 A | | 2/2019 |
| WO | 2009/096451 A1 | | 8/2009 |
| WO | 2011/040562 A1 | | 4/2011 |
| WO | 2013/073011 A1 | | 5/2013 |

* cited by examiner

ENERGY STORAGE DEVICE

TECHNICAL FIELD

The present invention relates to an energy storage device.

BACKGROUND ART

Secondary batteries typified by lithium ion secondary batteries are widely in use for electronic equipment such as personal computers and communication terminals, automobiles, and the like because the batteries have high energy density. The secondary battery is generally provided with an electrode assembly, having a pair of electrodes electrically isolated by a separator, and a nonaqueous electrolyte interposed between the electrodes and is configured to charge and discharge by transferring ions between both the electrodes. Capacitors such as lithium ion capacitors and electric double-layer capacitors are also widely in use as energy storage devices except for the secondary batteries.

In the energy storage device, heat may be generated when the energy storage device is handled in an abnormal manner. When heat is generated, the separator is melted, so that a positive electrode and a negative electrode come into contact with each other, and a short circuit may occur. Patent Document 1 describes that in order to prevent such a short circuit due to heat generation, a separator in which a heat-resistant porous layer containing a filler as a main component is provided in a porous layer containing a thermoplastic resin as a main component is used in a nonaqueous secondary battery.

PRIOR ART DOCUMENT

Patent Document

Patent Document 1: JP-A-2013-254639

SUMMARY OF THE INVENTION

Problems to be Solved by the Invention

According to the nonaqueous secondary battery described in Patent Document 1, even when the thermoplastic resin of the separator is melted, the short circuit between the positive electrode and the negative electrode can be prevented by the heat-resistant porous layer. However, even when the separator provided with the heat-resistant porous layer as described above is used, electric resistance decreases between the positive electrode and the negative electrode at the time of heat generation.

The present invention has been made based on the above circumstances, and an object of the present invention is to provide an energy storage device having high electric resistance between electrodes even when heat is generated due to abnormal handling.

Means for Solving the Problems

One aspect of the present invention made to solve the above problems is an energy storage device including: an electrode having a mixture layer containing active material particles; and a separator having an inorganic layer facing the mixture layer, the inorganic layer containing inorganic particles, in which the active material particles have two or more peaks in volume-based particle size distribution, and an average particle diameter of the inorganic particles is 1.2 µm or less.

Advantages of the Invention

According to the present invention, it is possible to provide an energy storage device having high electric resistance between electrodes even when heat is generated due to abnormal handling.

MODE FOR CARRYING OUT THE INVENTION

One aspect of the present invention is an energy storage device including: an electrode having a mixture layer containing active material particles; and a separator having an inorganic layer facing the mixture layer, the inorganic layer containing inorganic particles, in which the active material particles have two or more peaks in volume-based particle size distribution, and an average particle diameter of the inorganic particles is 1.2 µm or less.

In the energy storage device, electric resistance between electrodes is high even when heat is generated due to abnormal handling. That is, according to the energy storage device, even when heat is generated due to abnormal handling, a decrease in resistance between a positive electrode and a negative electrode is suppressed, and good insulation properties are sufficiently maintained. Although the reason why such an effect occurs is not clear, the following reason is presumed. When a conventional separator made of a resin is used, the resin of the separator melted with heat generation flows into the porous mixture layer, so that a short circuit occurs between the positive and the negative electrodes. Even when the separator is provided with an inorganic layer, when heat is generated, inorganic particles forming the inorganic layer flow into the mixture layer together with the molten resin, for example, so that the positive electrode and the negative electrode cannot be sufficiently insulated, and the electric resistance is reduced. On the other hand, in the energy storage device, inorganic particles having an average particle diameter of 1.2 µm or less are used for the inorganic layer of the separator. The inorganic layer formed of inorganic particles having such a small particle diameter is a porous layer having a relatively small pore diameter. Thus, the molten resin of the separator is easily held by the inorganic layer and as a result hardly flows into the mixture layer. In addition, in the energy storage device, active material particles having two or more peaks in a particle size distribution are used for the mixture layer of the electrode. In the mixture layer formed of such active material particles, a layer is provided in which a gap between large particles is filled with small particles and which has a relatively low porosity. For this reason, the molten resin of the separator and the inorganic particles of the inorganic layer hardly enter the gap in the mixture layer. As described above, the energy storage device has a structure in which a resin or inorganic particles melted by heat generation hardly flow into the mixture layer, and it is presumed that this can suppress a reduction in resistance between electrodes when heat is generated.

Here, the "particle size distribution" of the active material particles is a measurement value obtained by the following method. A laser diffraction type particle size distribution measuring apparatus ("SALD-2200" manufactured by Shimadzu Corporation) is used as a measuring apparatus, and Wing SALD-2200 is used as measurement control software. As a measurement method, a scattering type measurement mode is adopted, a wet cell for measurement containing a dispersion in which the active material particles are dispersed in a solvent is placed in an ultrasonic environment for 5 minutes, and then set in an apparatus, and measurement is performed by irradiation with laser light to obtain a scattered light distribution. The particle size distribution can be obtained by approximating the obtained scattered light distribution by a log-normal distribution.

The "average particle diameter" of the inorganic particles can be measured using a scanning electron microscope (SEM). Specifically, it is as follows.

(1) The energy storage device is disassembled, the separator is taken out and then immersed in a solvent, and the inorganic particles are separated by filtration.
(2) From an image (planar image) obtained by observing the inorganic particles with SEM (10,000 times), ten particles are randomly selected.
(3) Grain boundaries and the like of the selected ten particles are observed, a major axis R1 and a minor axis R2 of each particle are determined, and an average value of R1 and R2 is taken as the particle diameter of each particle. The major axis R1 is the largest diameter in a particle image of the SEM. The minor axis R2 is a diameter in a direction perpendicular to the major axis R1 in the particle image of the SEM.
(4) An average value of the particle diameters of the selected ten particles obtained above is taken as the average particle diameter.

An aspect ratio of the inorganic particle is preferably 7 or more. By using the inorganic particles having such a high aspect ratio in the inorganic layer, the molten resin of the separator is more easily held by the inorganic layer, and the molten resin hardly flows from the inorganic layer into the mixture layer. When the aspect ratio of the inorganic particles is high, the inorganic particles themselves also hardly enter the mixture layer. That is, by using the inorganic particles having a high aspect ratio as described above, it is possible to further increase the electric resistance between the electrodes when heat is generated.

Here, the "aspect ratio" of the inorganic particles is a value defined by the following (1) to (3).

(1) The inorganic particles have parameters (r1, r2, and b) having three different lengths.
(2) The three parameters satisfy a relationship of r1≥r2>b.
(3) When an average value of r1 and r2 is a, the aspect ratio is represented by a/b.

The r1 corresponds to the major axis of the inorganic particles, the r2 corresponds to the minor axis of the inorganic particles, and the b corresponds to the thickness of the inorganic particles. Examples of a method of measuring the aspect ratio of the inorganic particles include the following methods. The energy storage device discharged to SOC=0% (discharge final state) is disassembled under an environment of a dew point of −20° C. or lower, and the separator is taken out. The separator is taken out and then immersed in the solvent, and the inorganic particles are separated by filtration. The inorganic particles are observed with an optical microscope, r1, r2, and b of high-order twenty inorganic particles having a large size are measured, and then each average value of r1, r2, and b is calculated. Each inorganic particle is observed in plan view and side view, and the same inorganic particle is measured in the plan view and the side view. r1 is the largest diameter in observation in plan view. r2 is a diameter in a direction perpendicular to r1 in observation in plan view. b is the largest length (thickness) in observation in side view.

It is preferable that the active material particles contain particles A and particles B having different mode diameters, a particle diameter ratio (A/B) that is the mode diameter of the particles A to the mode diameter of the particles B is 3 or more, and a content ratio (A/B) that is a content of the particles A to a content of the particles B is 4/6 or more. When the active material particles of the mixture layer contain two kinds of particles having such a particle diameter ratio and content ratio, the mixture layer is in a good filling state in which the molten resin of the separator and the inorganic particles particularly hardly flow. Therefore, in such a case, the electric resistance between the electrodes can be further increased when heat is generated.

Here, when "the active material particles have two peaks in volume-based particle size distribution", it is defined that "the active material particles include particles A and B having different mode diameters, and in the particle size distribution, while the particle diameter corresponding to the peak on a larger particle diameter side is a mode diameter (most frequent diameter) of the particle A, the particle diameter corresponding to the peak on a smaller particle diameter side is a mode diameter (most frequent diameter) of the particle B". The content ratio is a volume ratio and is obtained from the volume-based particle size distribution. In determining the content ratio, when a saddle portion is present between adjacent peaks in the particle size distribution of the active material, that is, when there is an overlap in the particle size distribution of each particle species, the particle diameter corresponding to the saddle portion is taken as a boundary between the particle species. When the active material particles have three or more peaks in the volume-based particle size distribution, a particle corresponding to a peak having the highest peak height is taken as the particle A, and a particle having the highest peak height among particles corresponding to a peak having a particle diameter smaller than that of the particle A is taken as the particle B.

A particle diameter (D10) at a cumulative degree of 10% of the active material particles is preferably 3 µm or less, and a particle diameter (D90) at a cumulative degree of 90% is preferably 10 µm or more. The fact that the active material particles satisfy such conditions means that the distribution of particle size of the active material particles is wide. When such active material particles are used, the effect of the present invention exerted by using inorganic particles having an average particle diameter of 1.2 µm or less for the inorganic layer of the separator is particularly remarkably produced.

The "particle diameter (D10)" and the "particle diameter (D90)" of the active material particles mean values at which the volume-based integrated distribution calculated in accordance with JIS-Z-8819-2 (2001) is 10% and 90%, respectively. Specifically, based on the volume-based particle size distribution of the active material particles described above, the particle diameter corresponding to a cumulative degree of 10% is taken as the particle diameter (D10), and a particle diameter corresponding to a cumulative degree of 90% is taken as the particle diameter (D90).

A packing density of the mixture layer is preferably 2.8 g/cm$^3$ or more, and more preferably 3.2 g/cm$^3$. When the mixture layer is a relatively dense layer as described above, the molten resin of the separator and the inorganic particles more hardly flow into the mixture layer, and the electric resistance between the electrodes at the time of heat generation can be further increased.

The "packing density" of the mixture layer refers to a value obtained by dividing a mass of the mixture layer by an apparent volume of the mixture layer. The apparent volume refers to a volume including a gap portion, and can be obtained as a product of the thickness and area of the mixture layer.

<Secondary Battery (Energy Storage Device)>

An energy storage device according to one embodiment of the present invention includes a positive electrode and a negative electrode which are electrodes, a separator, and an electrolyte. Hereinafter, a nonaqueous electrolyte secondary battery (hereinafter, also simply referred to as a "secondary battery") will be described as an example of the energy storage device. The positive electrode and the negative electrode usually form an electrode assembly alternately overlapped each other by stacking or winding the positive electrode and the negative electrode with a separator interposed therebetween. The electrode assembly is housed in a case, and the case is filled with the nonaqueous electrolyte. The nonaqueous electrolyte is interposed between the positive electrode and the negative electrode. As the case, a known metal case, a resin case or the like, which is usually used as a case of a secondary battery, can be used.

Figure 1:
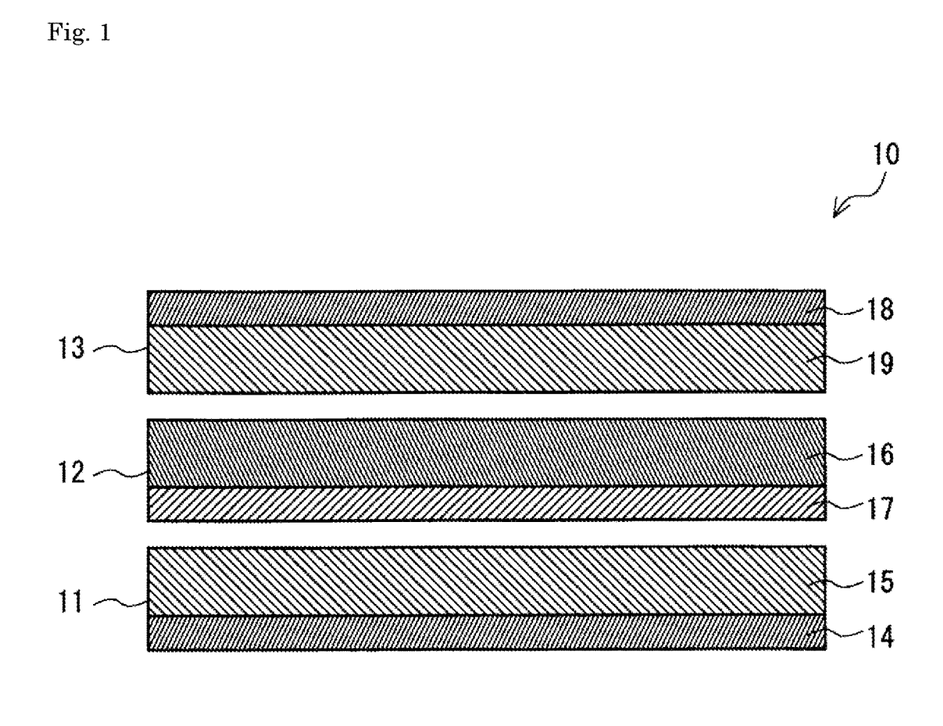
FIG. 1 is a schematic cross-sectional view illustrating a secondary battery according to one embodiment of an energy storage device of the present invention.

A secondary battery 10 as one embodiment of the present invention is schematically shown in FIG. 1. The secondary battery 10 includes a positive electrode 11, a separator 12, and a negative electrode 13 stacked in this order. In FIG. 1, a space between the positive electrode 11 and the separator 12 and a space between the separator 12 and the negative electrode 13 are shown to be spaced apart for convenience; however, they may be in contact with each other. In FIG. 1, description of other constituent elements of the secondary battery 10 such as a case is omitted.

(Positive Electrode)

The positive electrode 11 includes a positive electrode substrate 14 and a positive electrode mixture layer 15 stacked on the positive electrode substrate 14. The positive electrode 11 is a sheet having the laminated structure described above.

The positive electrode substrate 14 has conductivity. As the material of the positive electrode substrate 14, a metal such as aluminum, titanium, tantalum, stainless steel, or an alloy thereof is used. Among these, aluminum and aluminum alloys are preferable from the viewpoint of the balance of electric potential resistance, high conductivity, and cost. Example of the form of formation of the positive electrode substrate 14 include a foil and a vapor deposition film, and a foil is preferred from the viewpoint of cost. That is, the positive electrode substrate 14 is preferably an aluminum foil. Note that examples of the aluminum or aluminum alloy include A1085P and the like specified in JIS-H-4000 (2014).

The positive electrode mixture layer 15 contains positive active material particles. The positive electrode mixture layer 15 contains optional components such as a conductive agent, a binder (binding agent), a thickener, a filler, or the like as necessary. The positive electrode mixture layer 15 can be usually formed by applying a slurry of a positive electrode mixture containing each of these components to the positive electrode substrate 14 and drying the slurry. The packing density and the like of the positive electrode mixture layer 15 can be adjusted by pressing or the like.

The positive active material particles are particles of the positive active material. Examples of the positive active material include composite oxides represented by $Li_xMO_y$ (M represents at least one transition metal) ($Li_xCoO_2$, $Li_xNiO_2$, $Li_xMnO_3$, $Li_xNi_aCo_{(1-a)}O_2$, $Li_xNi_aMn_\beta Co_{(1-a-\beta)}O_2$ and the like each having a layered a-$NaFeO_2$-type crystal structure, and $Li_xMn_2O_4$, $Li_xNi_aMn_{(2-a)}O_4$ and the like each having a spinel-type crystal structure), and polyanion compounds represented by $Li_wMe_x(XO_y)_z$ (Me represents at least one transition metal, and X represents, for example, P, Si, B, V or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ and the like). The element or polyanion in these compounds may be partially substituted by another element or anion species.

The positive active material particles have two or more peaks in the volume-based particle size distribution. The upper limit of the number of peaks is not particularly limited, and may be four or three. The number of peaks may be two.

The positive active material particles preferably contain the particles A and the particles B having different mode diameters. These mode diameters correspond to a diameter of a peak position in the particle size distribution. The type of the positive active material constituting the particle A and the type of the positive active material constituting the particle B may be the same or different. Hereinafter, it will be described assuming that the mode diameter of the particle A is larger than the mode diameter of the particle B.

The lower limit of the particle diameter ratio (A/B), which is the mode diameter of the particle A with respect to the mode diameter of the particle B, is preferably 3, more preferably 3.3, and still more preferably 4 in some cases. When the particle diameter ratio (A/B) is the above lower limit or more, the positive electrode mixture layer 15 having a smaller gap can be formed, and intrusion of the molten resin and the inorganic particles can be further suppressed. On the other hand, the upper limit of the particle diameter ratio (A/B) is preferably 6, more preferably 5, and still more preferably 4 in some cases. When the particle diameter ratio (A/B) is the above upper limit or less, suitable porosity can be secured, and battery characteristics can be enhanced. Furthermore, when the particle diameter ratio (A/B) is the above upper limit or less, there is a possibility that the effect of suppressing the reduction in resistance between the electrodes when heat is generated can be enhanced.

The lower limit of the mode diameter of the particle A is preferably 5 μm, more preferably 8 μm, still more preferably 10 μm, and even more preferably 15 μm in some cases. On the other hand, the upper limit of the mode diameter of the particle A is preferably 30 μm, more preferably 20 μm, still more preferably 17 μm, and even more preferably 15 μm in some cases. The lower limit of the mode diameter of the particle B is preferably 1 μm, more preferably 2 μm, still more preferably 3 μm, and even more preferably 3.5 μm in some cases. On the other hand, the upper limit of the mode diameter of the particle B is preferably 8 μm, more preferably 5 μm, still more preferably 4 μm, and even more preferably 3.5 μm in some cases. When the mode diameters of the particle A and the particle B are within the above ranges, a degree of packing and the porosity of the positive electrode mixture layer 15 are more suitable.

The lower limit of the content ratio (A/B), which is the content of the particles A with respect to the content of the particles B, is preferably 4/6, more preferably 5/5, and still more preferably 6/4 in terms of volume ratio. On the other hand, the upper limit of the content ratio (A/B) is preferably 9/1, more preferably 8/2, still more preferably 7/3, and even more preferably 6.5/3.5 in terms of volume ratio. When the content ratio (A/B), which is the content of the particles A with respect to the content of the particles B, is within the above range, the degree of packing and the porosity of the positive electrode mixture layer 15 are more suitable.

The upper limit of the particle diameter (D10) at a cumulative degree of 10% of the positive active material particles may be, for example, 5 µm, 4 µm, or 3.5 µm, and is preferably 3 µm. The lower limit of the particle diameter (D90) at a cumulative degree of 90% is preferably 10 µm, and more preferably 15 µm. The fact that D10 is small and D90 is large means that the particle size distribution is wide. When the particle size distribution of the positive active material particles is relatively wide, the effect of suppressing the reduction in resistance at the time of heat generation, which is exhibited by using inorganic particles having an average particle diameter of 1.2 µm or less for the inorganic layer of the separator 12, can be remarkably exhibited. The lower limit of the particle diameter (D10) at a cumulative degree of 10% of the positive active material particles is preferably 1 µm, and more preferably 2 µm. The upper limit of the particle diameter (D90) at a cumulative degree of 90% of the positive active material particles is preferably 50 µm, and more preferably 30 µm. By using the positive active material particles having such a particle size distribution, the degree of packing and the porosity of the positive electrode mixture layer 15 are more suitable, and the effect of suppressing the reduction in resistance at the time of heat generation can be enhanced.

The lower limit of a content of the positive active material particles in the positive electrode mixture layer 15 is preferably 80% by mass, and more preferably 90% by mass. On the other hand, the upper limit of the content is preferably 99% by mass, and more preferably 96% by mass. When the content of the positive active material particles in the positive electrode mixture layer 15 is within the above range, the degree of packing and the porosity of the positive electrode mixture layer 15 are more suitable, and the effect of suppressing the reduction in resistance at the time of heat generation can be enhanced.

The conductive agent is not particularly limited so long as being a conductive material that does not adversely affect battery performance. Examples of such a conductive agent include natural or artificial graphite, carbon black such as furnace black, acetylene black, and ketjen black, metals, and conductive ceramics. Examples of the shape of the conductive agent include a powder shape, a fibrous shape, and a tubular shape.

Examples of the binder (binding agent) include: thermoplastic resins such as fluororesin (polytetrafluoroethylene (PTFE), polyvinylidene fluoride (PVDF), etc.), polyethylene, polypropylene, polyacryl, and polyimide; elastomers such as ethylene-propylene-diene rubber (EPDM), sulfonated EPDM, styrene-butadiene rubber (SBR), and fluororubber; and polysaccharide polymers.

Examples of the thickener include polysaccharide polymers such as carboxymethyl cellulose (CMC) and methyl cellulose. When the thickener has a functional group that reacts with lithium, it is preferable to inactivate the functional group by methylation or the like in advance.

The filler is not particularly limited so long as it does not adversely affect battery performance. The main components of the filler include polyolefins such as polypropylene and polyethylene, silica, alumina, magnesia, zeolite, glass, and aluminosilicate.

The lower limit of the packing density of the positive electrode mixture layer 15 is preferably 2.8 g/cm$^3$, and more preferably 3.2 g/cm$^3$. When the positive electrode mixture layer 15 is relatively dense as described above, the molten resin of the separator 12 and the inorganic particles more hardly flow into the positive electrode mixture layer 15. On the other hand, the upper limit of the packing density of the positive electrode mixture layer 15 is preferably 3.8 g/cm$^3$, and more preferably 3.4 g/cm$^3$. When the packing density of the positive electrode mixture layer 15 is the above upper limit or less, sufficient ion conductivity can be secured, for example. The packing density can be adjusted by the particle diameters and content ratios of the particles A and B, pressing against the positive electrode mixture layer 15, and the like.

(Separator)

The separator 12 is disposed on the positive electrode mixture layer 15 of the positive electrode 11. The separator 12 is disposed between the positive electrode 11 and the negative electrode 13. The separator 12 includes a resin layer 16 and an inorganic layer 17 stacked on the resin layer 16. The inorganic layer 17 may be provided on the positive electrode 11 side in the resin layer 16. The separator 12 is a sheet having the laminated structure described above.

The resin layer 16 is a porous resin film containing a resin as a main component. The "main component" refers to a component having the largest content on a mass basis. A woven fabric or a nonwoven fabric is also included in the porous resin film. As the resin of the resin layer 16, for example, polyolefin such as polyethylene or polypropylene is preferable, and polyethylene is more preferable from the viewpoint of strength. From the viewpoint of oxidative decomposition resistance, for example, polyimide, aramid or the like is preferable. These resins may be combined. As this resin, a thermoplastic resin can be suitably used. When the resin is the thermoplastic resin, a shutdown function at the time of heat generation is effectively generated. On the other hand, when the resin is the thermoplastic resin, the molten resin easily flows out with heat generation, and thus there is a great advantage of adopting the present invention.

The lower limit of the content of the resin in the resin layer 16 is preferably 60% by mass, more preferably 80% by mass, and still more preferably 95% by mass. The upper limit of the content may be 100% by mass.

(Inorganic Layer)

The inorganic layer 17 is provided to face the positive electrode mixture layer 15. That is, the inorganic layer 17 is present between the resin layer 16 and the positive electrode mixture layer 15.

The inorganic layer 17 contains inorganic particles. The inorganic layer 17 usually further contains a binder for binding the inorganic particles. The inorganic layer 17 is porous, so that the ion conductivity can be secured. The inorganic layer 17 can be formed, for example, by applying an inorganic layer-forming material, containing each component of the inorganic layer 17 and a dispersion medium, onto a surface of the resin layer 16 and drying the coating.

The upper limit of the average particle diameter of the inorganic particles in the inorganic layer 17 is 1.2 µm, and may be more preferably 0.7 µm. When the average particle diameter of the inorganic particles is the above upper limit or less, the inorganic layer 17 becomes a relatively dense porous layer. Thus, the resin melted from the resin layer 16 is easily held by the inorganic layer 17, and it is possible to suppress the reduction in resistance between the electrodes when heat is generated.

On the other hand, the lower limit of the average particle diameter of the inorganic particles is preferably 0.1 µm, more preferably 0.3 µm, and still more preferably 0.5 µm, 0.8 µm, or 1.0 µm in some cases. When the average particle diameter of the inorganic particles is the above lower limit or more, good ion conductivity can be secured. Furthermore, when the average particle diameter of the inorganic particles is the above lower limit or more, the inorganic particles hardly flow into the positive electrode mixture layer 15 even when heat is generated. Thus, even when heat is generated, good insulation properties between the electrodes can be secured, and the reduction in resistance can be further suppressed.

The lower limit of the aspect ratio of the inorganic particles may be, for example, 2, and is preferably 5, and more preferably 7. By using the inorganic particles having a high aspect ratio as described above, it is possible to further suppress the reduction in resistance between the electrodes when heat is generated. The upper limit of the aspect ratio may be, for example, 100 or 50.

The inorganic particles are usually particles having substantially no conductivity. Examples of the inorganic particles include inorganic oxides such as silica, alumina, titania, zirconia, magnesia, ceria, yttria, zinc oxide, and iron oxide, inorganic nitrides such as silicon nitride, titanium nitride, and boron nitride, silicon carbide, calcium carbonate, aluminum sulfate, aluminum hydroxide, potassium titanate, talc, kaolin clay, kaolinite, boehmite, halloysite, pyrophyllite, montmorillonite, sericite, mica, amesite, bentonite, asbestos, aluminosilicate, calcium silicate, magnesium silicate, diatomaceous earth, silica sand, and glass. Examples of the inorganic particles having a high aspect ratio include kaolinite and boehmite.

As the binder of the inorganic layer 17, a binder that can fix the inorganic particles, does not dissolve in an electrolyte, and is electrochemically stable in a use range is usually used. Examples of the binder include those described above as the binder used for the positive electrode mixture layer 15.

An average thickness of the inorganic layer 17 is not particularly limited, and the lower limit is preferably 0.1 µm, more preferably 0.2 µm, and still more preferably 0.5 µm, 1 µm, or 2 µm. When the average thickness of the inorganic layer 17 is the above lower limit or more, the molten resin of the resin layer 16 can be particularly sufficiently held. From the same viewpoint, the lower limit of a ratio of the average thickness of the inorganic layer 17 to the average thickness of the resin layer 16 is preferably 0.1, and more preferably 0.2. On the other hand, the upper limit of the average thickness of the inorganic layer 17 is preferably 10 µm, and more preferably 6 µm. When the average thickness of the inorganic layer 17 is the above upper limit or less, it is possible to achieve miniaturization and a higher energy density of the secondary battery 10.

(Negative Electrode)

The negative electrode 13 includes a negative electrode substrate 18 and a negative electrode mixture layer 19 stacked on the negative electrode substrate 18. The negative electrode 13 is a sheet having the laminated structure described above.

The negative electrode substrate 18 has conductivity. Although the negative electrode substrate 18 may have the same configuration as that of the positive electrode substrate 14, as the material, metals such as copper, nickel, stainless steel, and nickel-plated steel or alloys thereof are used, and copper or a copper alloy is preferable. That is, the negative electrode substrate 18 is preferably a copper foil. Examples of the copper foil include rolled copper foil, electrolytic copper foil, and the like.

The negative electrode mixture layer 19 contains negative active material particles. The negative electrode mixture layer 19 contains optional components such as a conductive agent, a binder (binding agent), a thickener, a filler, or the like as necessary. As regards the optional component such as a conductive agent, a binding agent, a thickener, or a filler, it is possible to use the same component as in the positive electrode mixture layer 15. The negative electrode mixture layer 19 can be usually formed by applying a slurry of a negative electrode mixture containing each of these components to the negative electrode substrate 18 and drying the slurry.

The negative active material particles are particles of the negative active material. As the negative active material, a material capable of absorbing and releasing lithium ions is usually used. Specific examples of the negative active material include metals or metalloids such as Si and Sn; metal oxides or metalloid oxides such as a Si oxide and a Sn oxide; a polyphosphoric acid compound; and carbon materials such as graphite and non-graphitic carbon (easily graphitizable carbon or hardly graphitizable carbon).

(Nonaqueous Electrolyte)

The nonaqueous electrolyte can be appropriately selected from known nonaqueous electrolytes. As the nonaqueous electrolyte, a nonaqueous electrolyte solution may be used. The nonaqueous electrolyte solution contains a nonaqueous solvent and an electrolyte salt dissolved in the nonaqueous solvent.

As the nonaqueous solvent, it is possible to use a known nonaqueous solvent usually used as a nonaqueous solvent of a general nonaqueous electrolyte for an energy storage device. Examples of the nonaqueous solvent include cyclic carbonate, chain carbonate, ester, ether, amide, sulfone, lactone, and nitrile. Among these, it is preferable to use at least the cyclic carbonate or the chain carbonate, and it is more preferable to use the cyclic carbonate and the chain carbonate in combination. When the cyclic carbonate and the chain carbonate are used in combination, the volume ratio of the cyclic carbonate to the chain carbonate (cyclic carbonate: chain carbonate) is not particularly limited but is preferably 5:95 or more and 50:50 or less, for example.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate.

Examples of the chain carbonate include diethyl carbonate (DEC), dimethyl carbonate (DMC), ethyl methyl carbonate (EMC), and diphenyl carbonate.

As the electrolyte salt, it is possible to use a known electrolyte salt usually used as an electrolyte salt of a general nonaqueous electrolyte for an energy storage device. Examples of the electrolyte salt include a lithium salt, a sodium salt, a potassium salt, a magnesium salt, and an onium salt, but a lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$.

The nonaqueous electrolyte may contain components other than the nonaqueous solvent and the electrolyte salt as long as the effects of the present invention are not impaired. Examples of the other components include various additives contained in a general nonaqueous electrolyte for an energy storage device.

(Method of Manufacturing Secondary Battery)

A method of manufacturing the secondary battery is not particularly limited. The method of manufacturing the secondary battery includes, for example, a step of preparing a positive electrode and a negative electrode, a step of preparing a nonaqueous electrolyte, a step of forming an electrode assembly in which the positive electrode and the negative electrode are alternately superposed by stacking or winding the positive electrode and the negative electrode with a separator interposed between the electrodes, a step of housing the positive electrode and the negative electrode (electrode assembly) in a battery case, and a step of injecting the nonaqueous electrolyte into the battery case. The injection can be performed by a known method. A secondary battery can be obtained by sealing an injection port after the injection.

Other Embodiments

The present invention is not limited to the aforementioned embodiments, and, in addition to the aforementioned aspects, can be carried out in various aspects with alterations and/or improvements being made.

In the above embodiment, the case where the electrode having the mixture layer containing the active material particles having two or more peaks in the volume-based particle size distribution is the positive electrode has been described; however, in this case, the positive electrode and the separator are arranged such that the positive electrode mixture layer of the positive electrode and the inorganic layer of the separator face each other. Such an electrode may be a negative electrode. That is, the negative active material particles contained in the negative electrode mixture layer of the negative electrode may have two or more peaks in the volume-based particle size distribution. In this case, the negative electrode and the separator may be arranged such that the negative electrode mixture layer of the negative electrode and the inorganic layer of the separator face each other. The active material layers of both the positive electrode and the negative electrode may contain active material particles having two or more peaks in the particle size distribution. In this case, an inorganic layer may be provided on both surfaces of the separator.

The active material particles may be composed of three or more types of particles having different mode diameters. However, from the viewpoint of ease of controlling the particle size distribution and the like, a mixture of two types of particles (particles A and particles B) having different mode diameters is preferable.

In the above embodiment, the energy storage device is a nonaqueous electrolyte secondary battery, but other energy storage devices may be used. Examples of another energy storage device include capacitors (electric double layer capacitors and lithium ion capacitors) and secondary batteries in which an electrolyte contains water. In addition, for example, an intermediate layer may be provided between the positive electrode substrate and the positive electrode mixture layer or between the negative electrode substrate and the negative electrode mixture layer. When such an intermediate layer contains conductive particles such as carbon particles, contact resistance between the substrate and the mixture layer can be reduced.

Figure 2:
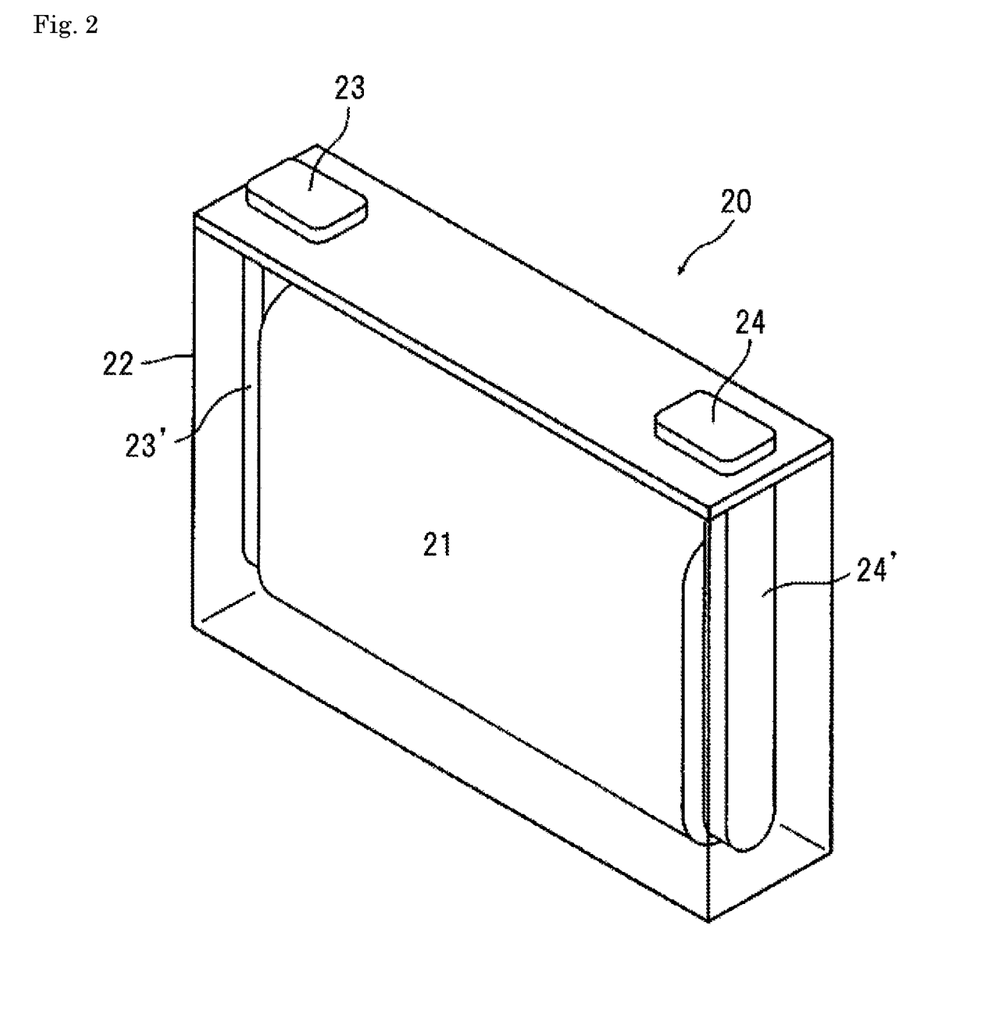
FIG. 2 is a schematic perspective view illustrating the secondary battery according to one embodiment of the energy storage device of the present invention.

FIG. 2 is a schematic view of a rectangular secondary battery 20 as one embodiment of the energy storage device according to the present invention. FIG. 2 is a view showing the inside of a battery case in a perspective manner. In the secondary battery 20 shown in FIG. 2, an electrode assembly 21 is housed in a battery case 22. The electrode assembly 21 is formed by winding the positive electrode and the negative electrode via the separator. The positive electrode is electrically connected to a positive electrode terminal 23 via a positive electrode lead 23', and the negative electrode is electrically connected to a negative electrode terminal 24 via a negative electrode lead 24'.

Figure 3:
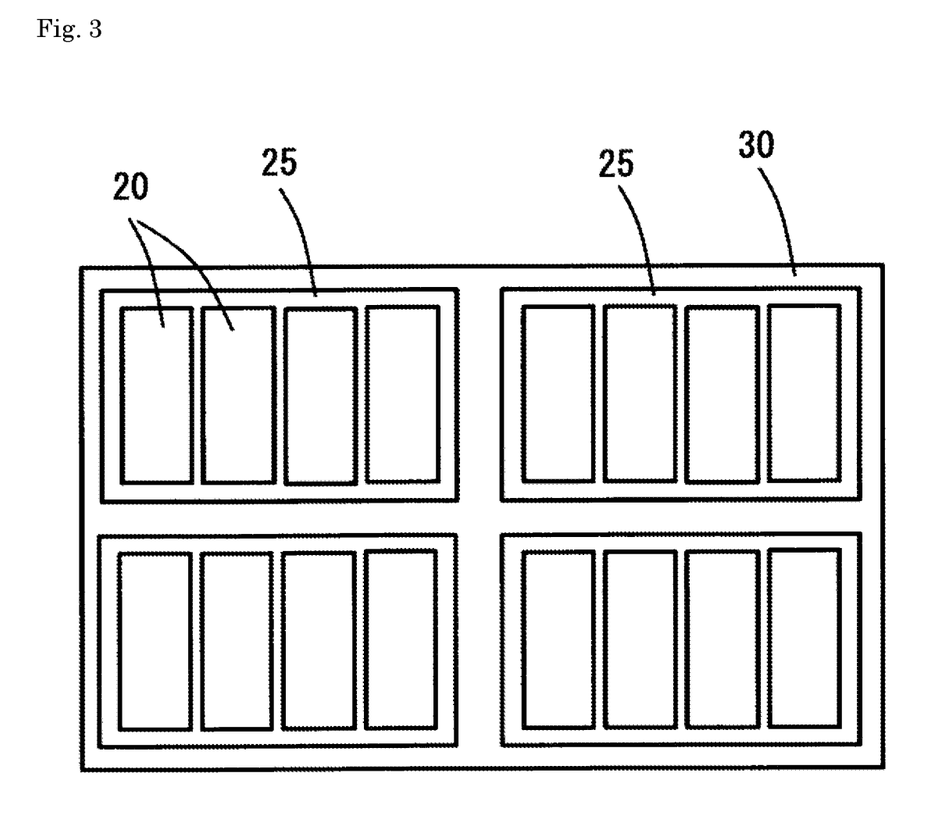
FIG. 3 is a schematic view illustrating an energy storage apparatus configured by aggregating a plurality of the secondary batteries according to one embodiment of the energy storage device of the present invention.

In addition, the configuration of the energy storage device according to the present invention is not particularly limited, and examples include cylindrical batteries, prismatic batteries (rectangular batteries) and flat batteries. The present invention can also be realized as an energy storage apparatus including a plurality of the energy storage devices. FIG. 3 shows one embodiment of an energy storage apparatus. In FIG. 3, an energy storage apparatus 30 includes a plurality of energy storage units 25. Each of the energy storage units 25 includes a plurality of the energy storage devices (secondary batteries 20). The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described more specifically by way of examples, but the present invention is not limited to the following examples.

Example 1

(1) Production of Positive Electrode

As the positive active material particles, positive active material particles b (NCM523: $LiNi_{1/2}Co_{1/5}Mn_{3/10}O_2$) in which the particles A having a mode diameter of 10 μm and the particles B having a mode diameter of 3 μm were mixed at a volume ratio of 6:4 were provided. Acetylene black was used as a conductive agent, and polyvinylidene fluoride (PVDF) was used as a binder. An appropriate amount of N-methyl-2-pyrrolidone (NMP) was added to a mixture obtained by mixing the positive active material particles b, the conductive agent, and the binder at a mass ratio of 91:5:4 to adjust the viscosity, thereby preparing a paste-like positive electrode mixture. The positive electrode mixture was applied to both surfaces of an aluminum foil (positive electrode substrate) and dried to prepare a positive electrode in which a positive electrode mixture layer was formed on the positive electrode substrate. The obtained positive electrode mixture layer had an average thickness of 140 μm. The positive electrode mixture layer was not formed on the positive electrode, a portion where the positive electrode substrate was exposed was provided, and the portion where the positive electrode substrate was exposed and the positive electrode lead were joined.

(2) Production of Negative Electrode

Graphite was used as negative active material particles, styrene-butadiene rubber (SBR) was used as a binder, and carboxymethyl cellulose (CMC) was used as a thickener. An appropriate amount of water was added to a mixture obtained by mixing the negative active material particles, the binder and the thickener at a mass ratio of 95:3:2 to adjust the viscosity, thereby preparing a paste-like negative electrode mixture. The negative electrode mixture was applied onto both surfaces of a copper foil (negative electrode substrate) and dried to prepare a negative electrode. The negative electrode mixture was not formed on the negative electrode, a portion where the negative electrode substrate was exposed was provided, and the portion where the negative electrode substrate was exposed and the negative electrode lead were joined.

(3) Production of Separator

A polyethylene porous sheet having an average thickness of 15 μm was prepared. On the other hand, an appropriate amount of carboxymethyl cellulose (CMC) was added to a mixture obtained by mixing the inorganic particles f (Material: alumina, aspect ratio: 7, average particle diameter: 1.2 μm) and the binder at a mass ratio of 95:5 to adjust the viscosity, thereby preparing a paste-like inorganic layer-forming material. This inorganic layer-forming material was applied onto one surface of the porous sheet and dried. As a result, an inorganic layer having an average thickness of 5 μm was formed on a surface of the porous sheet (resin layer) to obtain a separator.

(4) Production of Electrode Assembly

The obtained positive electrode (3.0 cm×3.0 cm), separator (3.5 cm×3.5 cm) and negative electrode (3.2 cm×3.2 cm) were stacked in this order to obtain an electrode assembly. The positive electrode mixture layer of the positive electrode and the inorganic layer of the separator were overlapped so as to face each other.

Examples 2 to 4, Comparative Examples 1 to 6

Electrode assembly of each of Examples 2 to 4 and Comparative Examples 1 to 6 was obtained in the same manner as in Example 1 except that the type of the positive active material particles in the production of the positive electrode and the type of the inorganic particles in the production of the separator were as shown in Table 1. Table 1 collectively shows the mode diameter and the content ratio of the particles contained in the positive active material particles used, the particle diameter (D10) at a cumulative degree of 10% of the positive active material particles, the particle diameter (D90) at a cumulative degree of 90% of the positive active material particles, the packing density of the obtained positive electrode mixture layer, and the average particle diameter and the aspect ratio of the inorganic particles used. These were measured by the method described above. When the particle size distributions of positive active material particles a to d used in Examples and Comparative Examples were measured by the method described above, the positive active material particles a corresponded to the particle size distribution having one peak, and the positive active material particles b, c, and d corresponded to the particle size distribution having two peaks.

[Evaluation]

(Measurement of Resistance After Heating)

Each of the obtained electrode assemblies was sandwiched between two SUS plates, pressed with a torque of 0.3 N m, and heated at 200° C. for 1 hour. After the heating, the electric resistance between the positive electrode and the negative electrode in each electrode assembly was measured by a resistance meter RM3545 (manufactured by HIOKI E.E. CORPORATION). The measurement results are shown in Table 1. Table 1 shows a resistance increase amount based on Comparative Example using inorganic particles e having an average particle diameter of 1.8 μm compared between Examples and Comparative Examples using the same active material particles. That is, for example, in Comparative Examples 1 to 3 using the active material particles a, the resistance increase amount based on Comparative Example 1 is shown.

TABLE 1

| | Positive electrode mixture layer | | | | | | Separator Inorganic particle | | | Evaluation | |
|---|---|---|---|---|---|---|---|---|---|---|---|
| | Active material particle | | | | | | | Average | | Resistance | |
| Resistance increase amount | Type | Mode diameter (particle A/particle B) μm | Content ratio (particle A/particle B) (Volume ratio) | D10 μm | D90 μm | Packing density g/cm³ | Type | particle diameter μm | Aspect ratio | after heating Ω | ΔΩ (vs. 1.5 μm) |
| Comparative Example 1 | a (single particle) | 10/— | 10/0 | 7.0 | 20 | 3.2 | e | 1.8 | 3 | 118 | — |
| Comparative Examples 2 | a (single particle) | 10/— | 10/0 | 7.0 | 20 | 3.2 | f | 1.2 | 7 | 207 | 89 |
| Comparative Examples 3 | a (single particle) | 10/— | 10/0 | 7.0 | 20 | 3.2 | g | 0.7 | 2 | 222 | 104 |
| Comparative Examples 4 | b (mixture of large and small particles) | 10/3 | 6/4 | 2.5 | 18 | 3.2 | e | 1.8 | 3 | 175 | — |
| Examples 1 | b (mixture of large and small particles) | 10/3 | 6/4 | 2.5 | 18 | 3.2 | f | 1.2 | 7 | 553 | 378 |
| Examples 2 | b (mixture of large and small particles) | 10/3 | 6/4 | 2.5 | 18 | 3.2 | g | 0.7 | 2 | 530 | 355 |
| Comparative Examples 5 | c (mixture of large and small particles) | 17/4 | 7/3 | 4.0 | 20 | 3.3 | e | 1.8 | 3 | 300 | — |
| Examples 3 | c (mixture of large and small particles) | 17/4 | 7/3 | 4.0 | 20 | 3.3 | f | 1.2 | 7 | 546 | 247 |
| Comparative Examples 6 | d (mixture of large and small | 17/4 | 6/4 | 3.5 | 20 | 3.3 | e | 1.8 | 3 | 360 | — |

TABLE 1-continued

| | Positive electrode mixture layer | | | | | | Separator Inorganic particle | | Evaluation | |
| | Active material particle | | | | | | Average | | Resistance | |
| Resistance increase amount | Type | Mode diameter (particle A/particle B) µm | Content ratio (particle A/particle B) (Volume ratio) | D10 µm | D90 µm | Packing density g/cm³ | Type | particle diameter µm | Aspect ratio | after heating Ω | ΔΩ (vs. 1.5 µm) |
|---|---|---|---|---|---|---|---|---|---|---|---|
| Examples 4 | d (mixture of large and small particles) | 17/4 | 6/4 | 3.5 | 20 | 3.3 | f | 1.2 | 7 | 597 | 237 |

As shown in Table 1, in Examples 1 to 4 in which the positive active material particles b, c or d having two or more peaks in the particle size distribution were used, and inorganic particles f or g having an average particle diameter of 1.2 µm or less were used in the inorganic layer of the separator, the electric resistance between the positive and negative electrodes after heating was high. That is, in Examples 1 to 4, it can be seen that the reduction in resistance between the electrodes can be suppressed even when heat is generated. Such an effect is presumed to be due to the fact that the use of the inorganic particles having an average particle diameter of 1.2 µm or less for the inorganic layer of the separator makes it difficult for the molten resin of the resin layer to flow out from the inorganic layer, and the use of particles having two or more peaks in the particle size distribution for the positive active material particles makes it difficult for the molten resin and the inorganic particles to flow into the positive electrode mixture layer. That is, in Examples 1 to 4, it is presumed that the resin and the inorganic particles of the separator remain between the positive electrode and the negative electrode due to the above reason even after heating, and the insulation properties due to these are maintained.

Focusing on the value of the "resistance increase amount" in Table 1, among Examples 1 to 4, in Examples 1 and 2 using the positive active material particles b, the resistance increase amount after heating by using the inorganic particles having an average particle diameter of 1.2 µm or less for the inorganic layer of the separator is particularly large. In the positive active material particles b, the particle diameter (D10) at a cumulative degree of 10% is 3 µm or less, and the particle diameter (D90) at a cumulative degree of 90% is 10 µm or more. It is found that when such positive active material particles are used, the effect of suppressing the reduction in resistance exerted by using the inorganic particles having an average particle diameter of 1.2 µm or less for the inorganic layer of the separator is remarkably exhibited. In Examples 1 to 4, the resistance itself after heating is the highest in Example 4. This is presumed to be because the formed positive electrode mixture layer has a structure in which the molten resin and the inorganic particles most hardly enter.

INDUSTRIAL APPLICABILITY

The present invention can be applied to a nonaqueous electrolyte secondary battery used as a power source for electronic devices such as personal computers and communication terminals, automobiles, and the like.

DESCRIPTION OF REFERENCE SIGNS 10, 20: secondary battery
11: positive electrode
12: separator
13: negative electrode
14: positive electrode substrate
15: positive electrode mixture layer
16: resin layer
17: inorganic layer
18: negative electrode substrate
19: negative electrode mixture layer
21: electrode assembly
22: battery case
23: positive electrode terminal
23': positive electrode lead
24: negative electrode terminal
24': negative electrode lead
25: energy storage unit
30: energy storage apparatus

The invention claimed is:

1. An energy storage device comprising:
an electrode having a mixture layer containing active material particles; and
a separator having an inorganic layer facing the mixture layer, the inorganic layer containing inorganic particles,
wherein the active material particles have two or more peaks in a volume-based particle size distribution, and
an average particle diameter of the inorganic particles is 1.2 µm or less.

2. The energy storage device according to claim 1, wherein an aspect ratio of the inorganic particle is 7 or more.

3. The energy storage device according to claim 1, wherein
the active material particles contain particles A and particles B having different mode diameters,
a particle diameter ratio (A/B) that is the mode diameter of the particles A to the mode diameter of the particles B is 3 or more, and
a content ratio (A/B) that is a content of the particles A to a content of the particles B is 4/6 or more.

4. The energy storage device according to claim 1, wherein a particle diameter (D10) at a cumulative degree of 10% of the active material particles is 3 µm or less, and a particle diameter (D90) at a cumulative degree of 90% is 10 µm or more.

5. The energy storage device according to claim 1, wherein a packing density of the mixture layer is 2.8 g/cm³ or more.

6. The energy storage device according to claim 1, wherein the packing density of the mixture layer is 3.2 g/cm³ or more.

7. The energy storage device according to claim 1, wherein
the active material particles contain particles A and particles B having different mode diameters, a particle diameter ratio (A/B) that is the mode diameter of the particles A to the mode diameter of the particles B is 3 or more and 6 or less, and a content ratio (A/B) that is a content of the particles A to a content of the particles B is 4/6 or more and 8/2 or less.

8. The energy storage device according to claim 1, wherein the active material particles contain particles A and particles B having different mode diameters, a particle diameter ratio (A/B) that is the mode diameter of the particles A to the mode diameter of the particles B is 3 or more and 4.5 or less, and a content ratio (A/B) that is a content of the particles A to a content of the particles B is 4/6 or more and 7/3 or less.

9. The energy storage device according to claim 1, wherein the active material particles contain particles A and particles B having different mode diameters, a composition of the particles A and a composition of the particle B are the same.

10. The energy storage device according to claim 1, wherein the average particle diameter of the inorganic particles is 0.7 μm or more and 1.2 μm or less.

11. The energy storage device according to claim 1, wherein the electrode having the mixture layer containing the active material particles is a positive electrode having a positive electrode mixture layer containing positive active material particles, the inorganic layer is in direct contact with the positive electrode mixture layer.

12. The energy storage device according to claim 1, wherein the separator further has a porous resin film, the inorganic layer is provided on only one surface of the porous resin film, and the inorganic layer is in direct contact with the mixture layer.

* * * * *